US010895934B2

(12) United States Patent
Shiomi

(10) Patent No.: US 10,895,934 B2
(45) Date of Patent: Jan. 19, 2021

(54) INFORMATION INPUT DEVICE

(71) Applicant: KYOCERA Document Solutions Inc., Osaka (JP)

(72) Inventor: Ryo Shiomi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/719,215

(22) Filed: Dec. 18, 2019

(65) Prior Publication Data

US 2020/0201476 A1 Jun. 25, 2020

(30) Foreign Application Priority Data

Dec. 21, 2018 (JP) ................................ 2018-239778

(51) Int. Cl.
*G06F 3/041* (2006.01)
*G06F 3/0488* (2013.01)
*G06F 3/0482* (2013.01)

(52) U.S. Cl.
CPC .......... *G06F 3/0418* (2013.01); *G06F 3/0482* (2013.01); *G06F 3/04883* (2013.01)

(58) Field of Classification Search
None
See application file for complete search history.

(56) References Cited

U.S. PATENT DOCUMENTS

2010/0110018 A1* 5/2010 Faubert ................... G06F 3/016 345/173
2011/0012855 A1* 1/2011 Yeh ..................... G06F 3/04186 345/173
2011/0179374 A1* 7/2011 Yagi ...................... G06F 3/0418 715/773
2011/0210923 A1* 9/2011 Pasquero ............ G06F 3/04886 345/173
2011/0285645 A1* 11/2011 Cho .................. G06F 3/041661 345/173
2013/0100061 A1* 4/2013 Kawauchi ............. G06F 3/0488 345/173
2013/0300672 A1* 11/2013 Griffin ................ G06F 3/04883 345/173

(Continued)

FOREIGN PATENT DOCUMENTS

JP 2014063222 A 4/2014

*Primary Examiner* — Patrick N Edouard
*Assistant Examiner* — Peijie Shen
(74) *Attorney, Agent, or Firm* — Studebaker & Brackett PC

(57) ABSTRACT

An information input device includes a display, a touch sensor, and a controller. The display displays a plurality of objects. The touch sensor outputs a signal indicating a touch position at which the touch surface is touched. When receiving the signal indicating the touch position, the controller determines whether or not the touch position is a position corresponding to any of the objects. When determining that the touch position is a position corresponding to any of the objects, the controller accepts the touch as a touch operation. When accepting the touch operation, the controller sets a portion of the touch surface as an erroneous input restriction region. The controller sets the erroneous input restriction region based on the touch position. When determining that the touch operation is cancelled, the controller changes the erroneous input restriction region based on the touch position.

8 Claims, 16 Drawing Sheets

(56) References Cited

U.S. PATENT DOCUMENTS

| | | | | |
|---|---|---|---|---|
| 2013/0300704 | A1* | 11/2013 | Takahashi | G06F 3/0488 345/173 |
| 2013/0335373 | A1* | 12/2013 | Tomiyasu | G06F 3/041 345/174 |
| 2014/0049678 | A1* | 2/2014 | Tanaka | G06F 3/04842 348/333.01 |
| 2015/0002451 | A1* | 1/2015 | Um | G06F 3/0446 345/174 |
| 2015/0160729 | A1* | 6/2015 | Nakagawa | G06F 3/016 345/173 |
| 2015/0261296 | A1* | 9/2015 | Yoshikawa | G06F 3/016 345/173 |
| 2016/0147365 | A1* | 5/2016 | Yoshida | G06F 3/0446 345/174 |
| 2016/0253039 | A1* | 9/2016 | Heo | G06F 3/04186 345/173 |
| 2016/0291764 | A1* | 10/2016 | Herring | G06F 3/0488 |
| 2017/0185227 | A1* | 6/2017 | Liao | G06F 3/04186 |
| 2017/0255283 | A1* | 9/2017 | Yeh | G06F 3/0418 |
| 2017/0255331 | A1* | 9/2017 | Yeh | G06F 3/0446 |

* cited by examiner

INFORMATION INPUT DEVICE

INCORPORATION BY REFERENCE

The present application claims priority under 35 U.S.C. § 119 to Japanese Patent Application No. 2018-239778, filed on Dec. 21, 2018. The contents of this application are incorporated herein by reference in their entirety.

BACKGROUND

The present disclosure relates to an information input device.

A touch panel capable of restricting reception of an unintentional user input operation unintended is disclosed. For example, a communication terminal device sets an invalid region according to a display position of an object such as a menu. Specifically, the communication terminal device includes a display panel, a touch panel, and a controller. The controller includes an invalid region setting section, a touch input coordinate detecting section, a touch region determining section, and an event processing section. The invalid region setting section sets a detection invalid region. The detection invalid region is a region in which detection of a touch operation on the touch panel is invalidated. The detection invalid region is set according to position of a menu included in a menu screen. Specifically, the detection invalid region is set in a manner to include a region in which a user's finger or the like is likely to touch by mistake when the user intends to touch a desired object. The touch input coordinate detecting section detects touch input coordinates. The touch input coordinates are coordinates on the touch panel at which a touch is detected. The touch region determining section determines whether or not the detected touch is valid. Specifically, the touch region determining section determines whether or not the detected touch is valid by determining whether or not the touch input coordinates are located within the detection invalid region. The event processing section invalidates the detected touch when the touch operation is invalid.

SUMMARY

An information input device according to the present disclosure includes a display, a touch sensor, and a controller. The display displays a plurality of objects. The touch sensor has a touch surface. The touch sensor outputs a signal indicating a touch position at which the touch surface is touched by a detection target. The controller receives the signal indicating the touch position. When receiving the signal indicating the touch position, the controller determines whether the touch position is a position corresponding to any one of the objects. When the controller determines that the touch position is a position corresponding to one of the objects, the controller accepts the touch as a touch operation. When accepting the touch operation, the controller sets a portion of the touch surface as an erroneous input restriction region. The erroneous input restriction region is a region in which erroneous input by the detection target is restricted. The controller sets the erroneous input restriction region based on the touch position. The controller determines whether or not the touch operation has been cancelled. When the controller determines that the touch operation has been cancelled, the controller changes the erroneous input restriction region based on the touch position.

DETAILED DESCRIPTION

Figure 1:
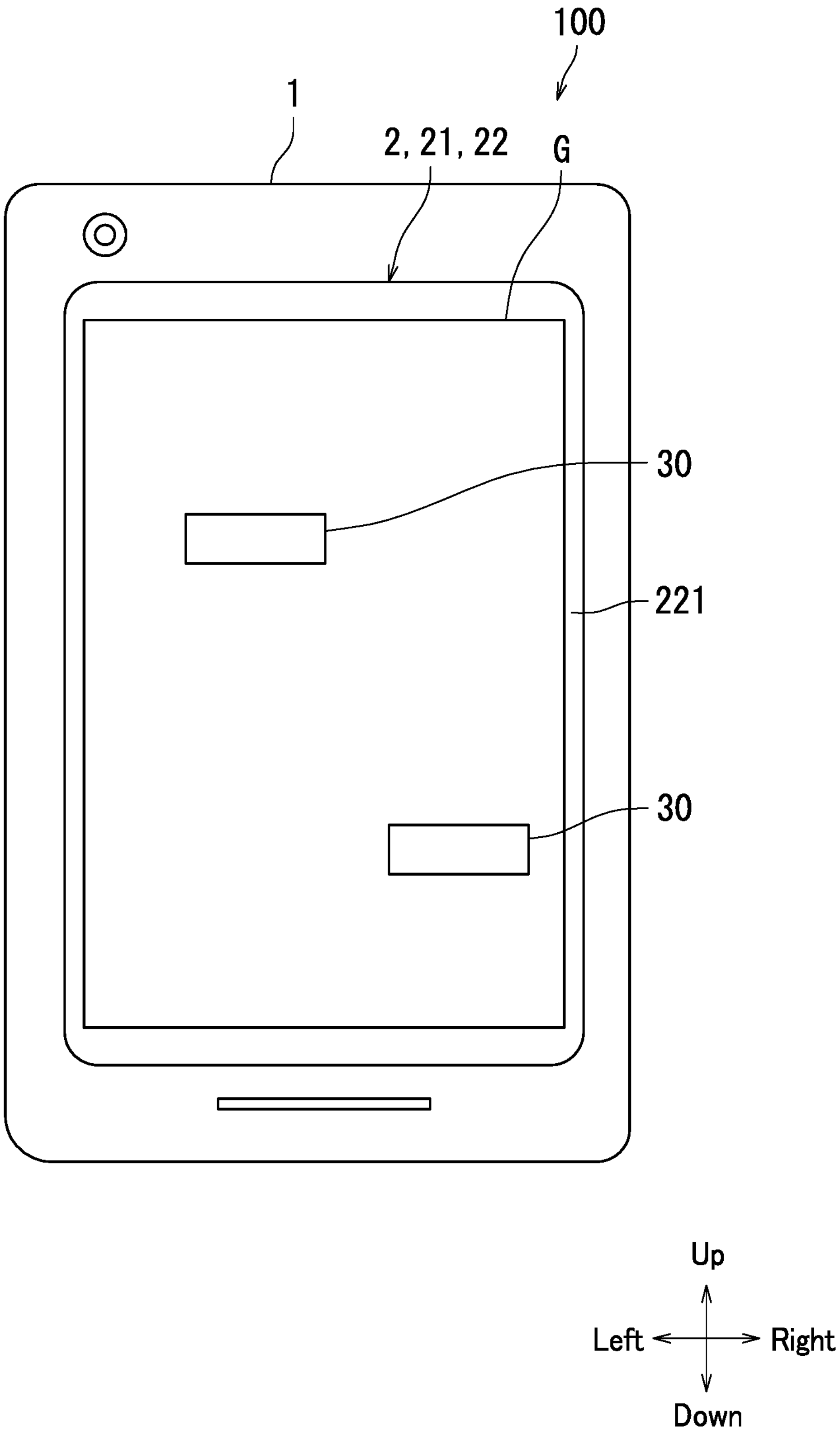
FIG. 1 is a diagram illustrating an information input device according to a first embodiment of the present disclosure.

The following describes an information input device according to the present disclosure with reference to the drawings. Note that elements that are the same or equivalent are indicated by the same reference signs in the drawings and description thereof is not repeated.

With reference to FIG. 1, an information input device 100 according to the embodiment of the present disclosure will be described. FIG. 1 is a diagram illustrating the information input device 100 according to the first embodiment of the present disclosure. In the embodiment, the information input device 100 is a portable terminal such as a smartphone.

As illustrated in FIG. 1, the information input device 100 includes a housing 1 and a touch panel 2. In the embodiment, the housing 1 has a substantially rectangular shape. In the following description of embodiments, the short direction of the housing 1 is referred to as the left-right direction and the longitudinal direction of the housing 1 is referred to as the vertical direction. Further, in the description of the embodiments, one side of the touch panel 2 in the left-right direction is referred to as a "right side" and the other side is referred to as a "left side". Also, in the description of the embodiments, one side of the touch panel 2 in the vertical direction is referred to as an "upper side" and the other side is referred to as a "lower side".

The touch panel 2 receives an input operation by the user. The touch panel 2 includes a display 21 and a touch sensor 22. The display 21 is a liquid crystal display, for example.

The display 21 displays various types of screens G Each screen G includes a plurality of objects 30. In other words, the display 21 displays a plurality of objects 30. The objects 30 are, for example, buttons and icons.

The touch sensor 22 is superposed on the display 21. The touch sensor 22 is, for example, a capacitive touch sensor.

The touch sensor 22 has a touch surface 221. In the present embodiment, the touch surface 221 has a substantially rectangular shape. The touch sensor 22 outputs a signal indicating a touch position at which the touch surface 221 is touched by a detection target. Hereinafter, such a signal indicating a touch position is referred to as a "touch signal". The touch signal includes, for example, coordinate data specifying the touch position. Hereinafter, the coordinate data specifying the touch position may be referred to as "touch coordinate data".

The touch panel 2 is accommodated in the housing 1 in such a manner that the touch surface 221 is exposed.

Figure 2:
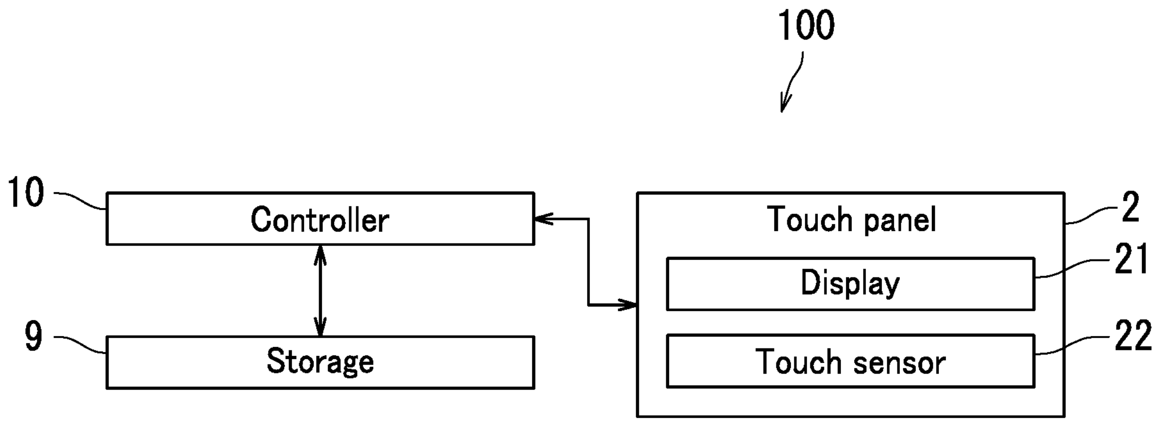
FIG. 2 is a block diagram illustrating a configuration of the information input device according to the first embodiment of the present disclosure.

Next, the configuration of the information input device 100 according to the present embodiment will be further described with reference to FIGS. 1 and 2. FIG. 2 is a block diagram illustrating the configuration of the information input device 100 according to the present embodiment.

As illustrated in FIG. 2, the information input device 100 further includes storage 9 and a controller 10.

The storage 9 stores various data therein. The storage 9 includes a storage device and semiconductor memory. The storage device includes, for example, a hard disk drive (HDD) and/or a solid state drive (SSD). The semiconductor memory constitutes, for example, random access memory (RAM) and read only memory (ROM).

The storage 9 stores therein, for example, screen information data related to a screen being displayed on the display 21. Hereinafter, the screen being displayed on the display 21 is referred to as a "displayed screen". The screen information data contains, for example, coordinate data specifying each position of the plurality of objects 30 (see FIG. 1) included in the displayed screen. The coordinate data includes, for example, coordinate data specifying the start point position of each object 30, and coordinate data specifying the end point position of each object 30.

The storage 9 further stores therein detection target type data relating to a detection target type. The detection target type means the type of detection target. The detection target is, for example, a stylus, the user's right hand, or the user's left hand. In the present embodiment, the detection target type data is stored in the storage 9 by, for example, the user selecting one of the stylus, the user's right hand, and the user's left hand as a detection target.

The controller 10 includes a processor such as a central processing unit (CPU). The controller 10 controls operation of each section of the information input device 100 by executing a control program stored in the storage 9. For example, the controller 10 causes the display 21 to display a screen G.

The controller 10 sets a detection sensitivity of the touch surface 221 when displaying the screen G on the display 21.

The detection sensitivity means a degree of acceptance at which the controller 10 accepts a touch on the touch surface 221 as a touch operation. The detection sensitivity is set, for example, by setting a threshold value for at least one of a touch area, a touch time, and a touch pressure. The touch area means an area of a touched portion on the touch surface 221. The touch time means a time from the start of a touch on any part of the touch surface 221 to the cancellation of the touch. The touch pressure means a pressure of a touch applied to the touch surface 221.

In the present embodiment, a first sensitivity is set as the detection sensitivity of the touch surface 221. The first sensitivity includes a first area threshold, a first time threshold, and a first pressure threshold. The first area threshold is a threshold for touch area where a touch is acceptable as a touch operation. The first time threshold is a threshold of touch time for which a touch is acceptable as a touch operation. The first pressure threshold is a threshold of touch pressure by which a touch is acceptable as a touch operation. The user can change the detection sensitivity by changing at least one of the first area threshold, the first time threshold, and the first pressure threshold.

The controller 10 receives a touch signal output from the touch sensor 22. When receiving the touch signal, the controller 10 executes a touch operation accepting process. In the touch operation accepting process, the controller 10 determines whether or not the touch position is a position corresponding to any one of the objects 30. When determining that the touch position is a position corresponding to any one of the objects 30, the controller 10 accepts the touch on the touch surface 221 as a touch operation. When determining that the touch position is not a position corresponding to any one of the objects 30, the controller 10 does not accept the touch on the touch surface 221 as a touch operation.

Figure 3:
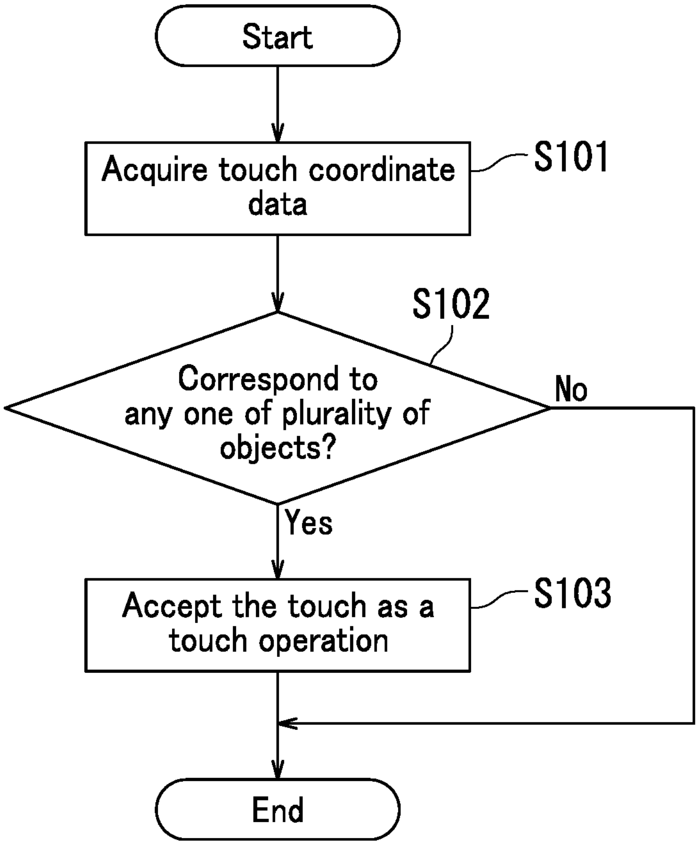
FIG. 3 is a flowchart illustrating a touch operation accepting process in the first embodiment of the present disclosure.

Next, the touch operation accepting process in the first embodiment will be described with reference to FIGS. 1 to 3. FIG. 3 is a flowchart illustrating a touch operation accepting process in the first embodiment.

As illustrated in FIG. 3, the controller 10 acquires touch coordinate data based on a touch signal (step S101). Next, the controller 10 determines whether or not the touch position is a position corresponding to any one of the objects 30 (see FIG. 1) (step S102). Specifically, the controller 10 determines whether or not the touch position is a position corresponding to any one of the objects 30 by searching for an object 30 in an object display range within which a touch coordinate indicated in touch coordinate data is located. The object display range is given by coordinate data specifying the start point position and coordinate data specifying the end point position of each of the objects 30 stored in the storage 9.

When any object 30 in an object display range within which the touch coordinate is located is not found, the controller 10 determines that the touch position is not a position corresponding to any of the objects 30 (step S102; No). When the controller 10 determines that the touch position is not a position corresponding to any of the objects 30, the touch operation accepting process ends without acceptance of the touch operation.

By contrast, when an object 30 in an object display range within which the touch coordinate is located is found, the controller 10 determines that the touch position is a position corresponding to one of the objects 30 (step S102; Yes). When the controller 10 determines that the touch position is a position corresponding to one of the objects 30 (step S102; Yes), the controller accepts the touch at the touch position as a touch operation (step S103) and the touch operation accepting process ends. When accepting the touch operation, the controller 10 stores in the storage 9 information about a corresponding object 30C corresponding to the touch position among the objects 30.

When accepting the touch operation, the controller 10 executes a touch operation validity determining process. In the touch operation validity determining process, the controller 10 determines whether or not the touch operation is valid.

Figure 4:
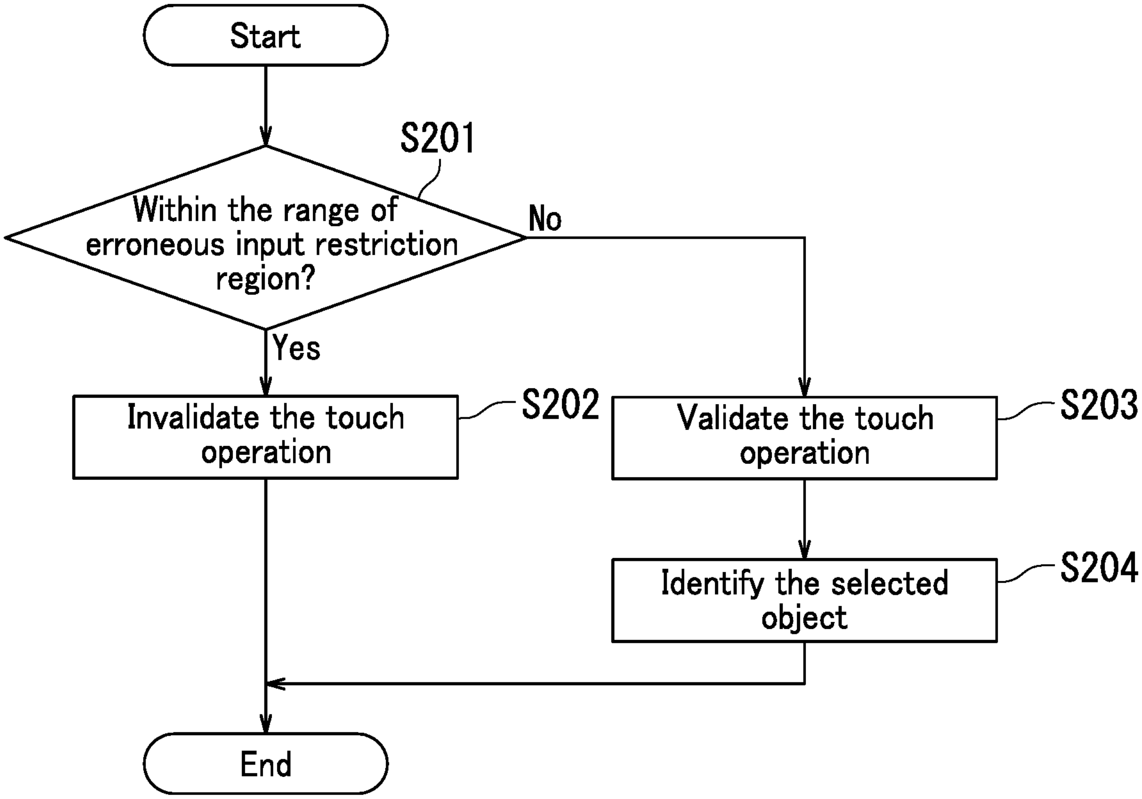
FIG. 4 is a flowchart illustrating a touch operation validity determining process in the first embodiment of the present disclosure.

Next, the touch operation validity determining process in the first embodiment will be described with reference to FIGS. 1 to 4. FIG. 4 is a flowchart illustrating the touch operation validity determining process in the first embodiment.

As illustrated in FIG. 4, the controller 10 determines whether or not the touch position is located in an erroneous input restriction region (step S201). The erroneous input restriction region is set in a region setting cancelling process described with reference to FIG. 5.

When determining that the touch position is located within the erroneous input restriction region (step S201; Yes), the controller 10 determines that the accepted touch operation is invalid (step S202) and the touch operation validity determining process ends.

By contrast, when determining that the touch position is not located within the erroneous input restriction region (step S201; No), the controller 10 determines that the accepted touch operation is valid (step S203) and identifies the object 30 that corresponds to the touch position (step S204). Hereinafter, the object 30 that corresponds to the touch position is referred to as a "selected object 30S". In the touch operation accepting process of the present embodiment described above with reference to FIG. 3, the controller 10 identifies the selected object 30S by referring to information about the corresponding object 30C stored in the storage 9. After the controller 10 identifies the selected object 30S, the touch operation validity determining process ends. Note that when the touch operation validity determining process ends, the information about the corresponding object 30C is deleted from the storage 9.

Further, after identifying the selected object 30S, the controller 10 executes a corresponding process corresponding to the selected object 30S. Specifically, the storage 9 stores each of the objects 30 in association with corresponding process data regarding a corresponding one of corresponding processes. The corresponding processes each are a process to be executed when the corresponding object 30 is selected. The corresponding process data contains, for example, a command for the controller 10 to execute the corresponding process. After identifying the selected object 30S, the controller 10 refers to the corresponding process data associated with the selected object 30S to execute the corresponding process.

Further, after identifying the selected object 30S, the controller 10 executes a region setting cancelling process. In the region setting cancelling process, the controller sets a portion of the touch surface 221 described above with reference to FIG. 1 as an erroneous input restriction region. The erroneous input restriction region is a region in which erroneous input by the detection target is restricted. The controller 10 sets the erroneous input restriction region based on the touch position.

Figure 5:
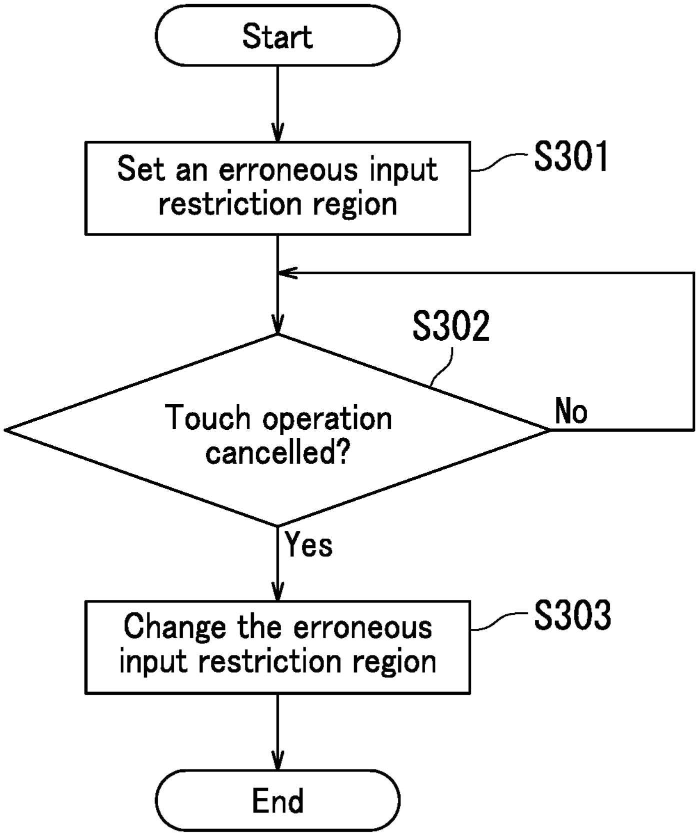
FIG. 5 is a flowchart illustrating a region setting cancelling process in the first embodiment of the present disclosure.

Next, the region setting cancelling process in the first embodiment will be described with reference to FIGS. 1 to 5. FIG. 5 is a flowchart illustrating the region setting cancelling process in the first embodiment.

As illustrated in FIG. 5, the controller 10 sets a portion of the touch surface 221 as an erroneous input restriction region (step S301). Next, the controller 10 determines whether or not the touch operation has been cancelled (step S302). Until cancellation of the touch operation is determined, the controller 10 waits (step S302: No). When determining that the touch operation has been cancelled (step S302; Yes), the controller 10 changes the erroneous input restriction region (step S303). When the erroneous input restriction region disappears from the touch surface 221 as a result of the controller 10 changing the erroneous input restriction region, the region setting cancelling process ends.

Figure 6:
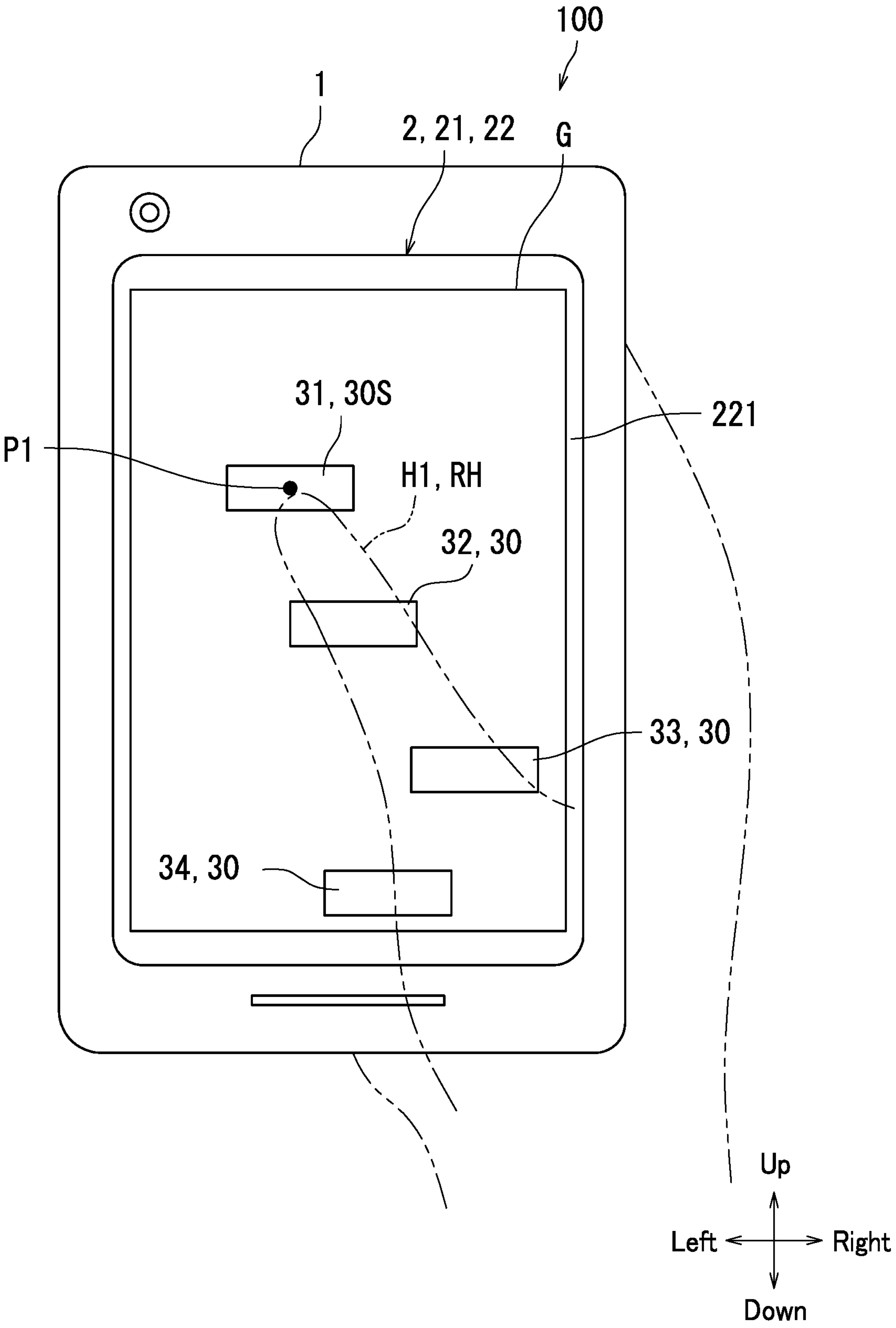
FIG. 6 is a diagram illustrating an example of a touch operation in the first embodiment of the present disclosure.

Next, the touch operation in the first embodiment will be specifically described with reference to FIGS. 1 to 6. FIG. 6 is a diagram illustrating an example of the touch operation in the first embodiment. Specifically, FIG. 6 illustrates a touch operation for selecting a first object 31. In FIG. 6, the user holds the information input device 100 with a right hand RH and touches the touch surface 221 with a right thumb H1. Hereinafter, the touch position indicated in FIG. 6 is referred to as a "first touch position P1". In FIG. 6, the user's right hand RH is indicated by long dashed double-dotted lines for easy understanding. In the touch surface 221, a portion overlapping with the user's right hand RH is a region where erroneous input is likely to occur. An erroneous input occurs due to transmission of a touch signal to the controller upon the user unintentionally touching the touch surface 221. Note that in the screen G illustrated in FIG. 6, no erroneous input restriction regions are set.

As illustrated in FIG. 6, the screen G includes four objects 30. In the present embodiment, the four objects 30 are substantially the same in size and shape. The four objects 30 are arranged at different positions in the vertical direction. Hereinafter, the four objects 30 are referred to as a "first object 31", a "second object 32", a "third object 33", and a "fourth object 34" in order from above.

The second object 32, the third object 33, and the fourth object 34 are separate from the first touch position P1 in the stated order. Specifically, the first object 31 is located above the center of the screen Gin the vertical direction. The second object 32 is located approximately at the center in the vertical direction. The third object 33 is located below the center in the vertical direction. The fourth object 34 is located below the third object 33. Specifically, the fourth object 34 is located near the outer edge on the lower side of the touch surface 221.

The first object 31 is located on the left side of the center in the left-right direction. The second object 32 is located approximately at the center in the left-right direction. The third object 33 is located on the right side of the center in the left-right direction. The third object 33 is located near the outer edge on the right side of the touch surface 221. The fourth object 34 is located on the right side of the center in the left-right direction. The fourth object 34 is located between the second object 32 and the third object 33 in the left-right direction. In the example illustrated in FIG. 6, the second object 32, the third object 33, and the fourth object 34 overlap with the user's right hand RH, and thus are likely to be touched by mistake.

As illustrated in FIG. 6, when the user touches the first touch position P1 with the right thumb H1 in order to select the first object 31, the controller 10 executes the touch operation accepting process (see FIG. 3). In the example illustrated in FIG. 6, the first touch position P1 is a position corresponding to the first object 31 (on the first object 31).

Therefore, the controller 10 accepts the touch on the first touch position P1 as a touch operation (step S103 in FIG. 3).

When accepting the touch operation, the controller 10 executes the touch operation validity determining process (see FIG. 4). In the example illustrated in FIG. 6, no erroneous input restriction regions are set. Therefore, the controller 10 determines that the accepted touch operation is valid (step S203 in FIG. 4), and identifies the selected object 30S as the first object 31 (step S204 in FIG. 4).

After identifying the selected object 30S, the controller 10 sets a portion of the touch surface 221 as an erroneous input restriction region by executing the region setting cancelling process (see FIG. 5). Specifically, the controller 10 sets a portion of the touch surface 221 as an erroneous input restriction region by referring to a setting rule. The setting rule is a rule referred to by the controller 10 in setting the erroneous input restriction region. The setting rule is set in advance and stored in the storage 9. In the present embodiment, the setting rule is a rule providing that the portion of the touch surface 221 other than a standard region is set as the erroneous input restriction region. Hereinafter, the setting rule providing that a portion of the touch surface 221 other than the standard region is set as the erroneous input restriction region is referred to as a "first rule".

The standard region is a region including the touch position. The standard region will be described with reference to FIG. 7. In the embodiment, the detection sensitivity in the standard region and the detection sensitivity in the erroneous input restriction region are set to the first sensitivity. In other words, the detection sensitivity in the standard region and the detection sensitivity in the erroneous input restriction region are substantially the same.

Figure 7:
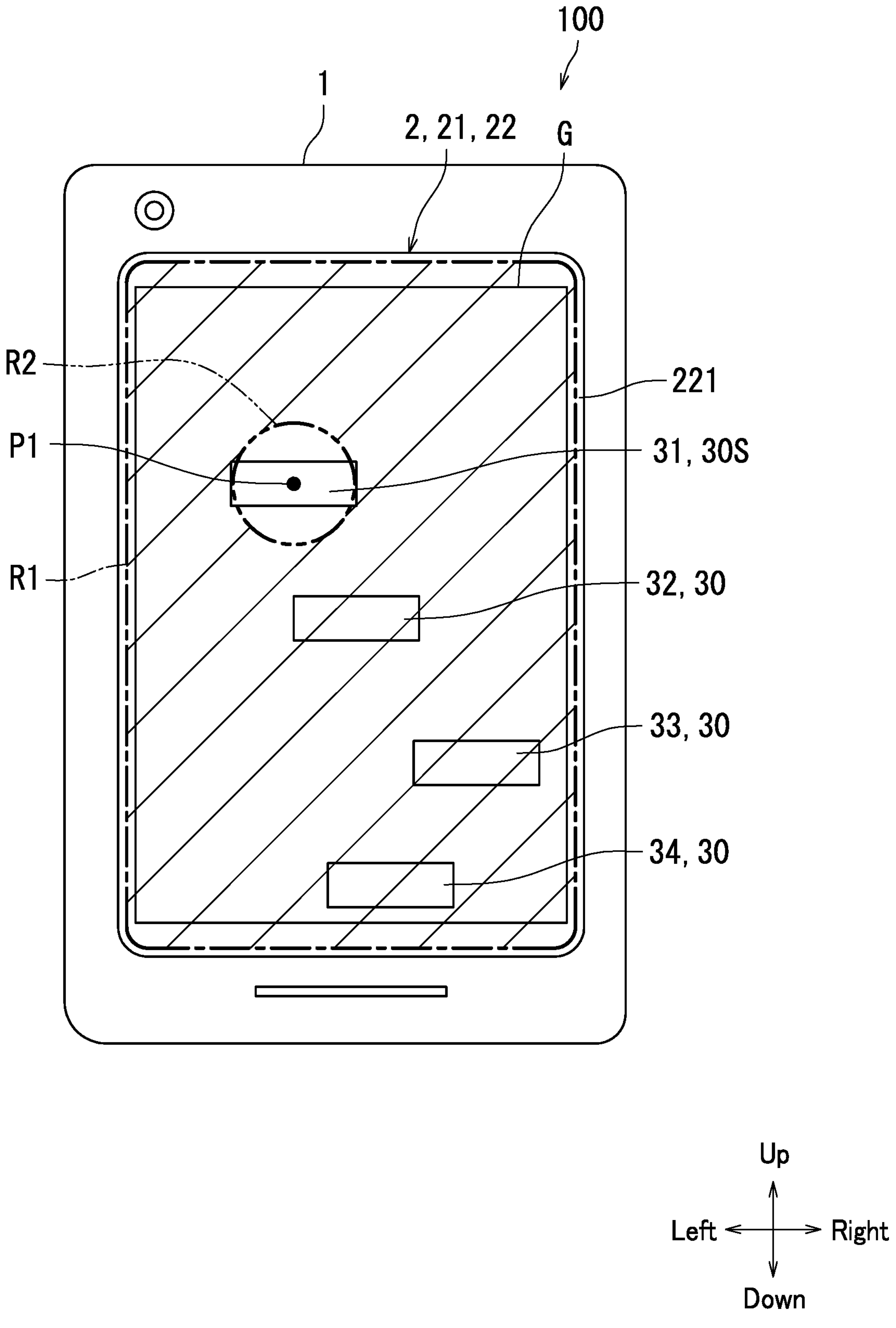
FIG. 7 is a diagram illustrating an erroneous input restriction region in the first embodiment of the present disclosure.
Figure 8:
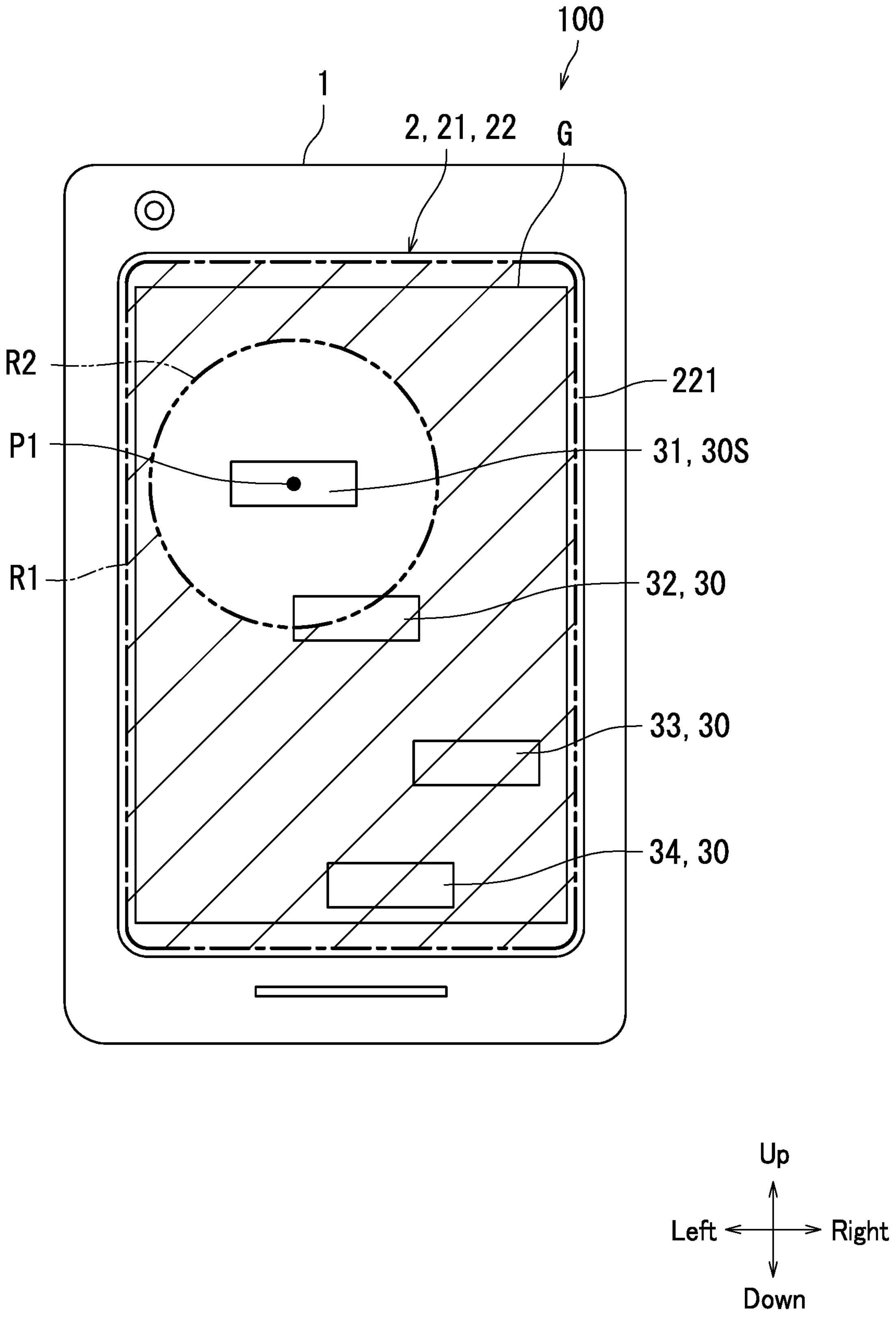
FIG. 8 is a diagram illustrating an erroneous input restriction region in the first embodiment of the present disclosure.

Next, the region setting cancelling process in the first embodiment will be specifically described with reference to FIGS. 1 to 8. FIGS. 7 and 8 are diagrams illustrating the erroneous input restriction region in the first embodiment. Specifically, FIG. 7 illustrates the erroneous input restriction region R1 that is set when the controller 10 identifies the selected object 30S. FIG. 8 illustrates the erroneous input restriction region R1 after a specific time period has elapsed since cancellation of the touch operation on the first touch position P1. In FIGS. 7 and 8, the erroneous input restriction region R1 is surrounded by a long dashed dotted line and the standard region R2 is surrounded by a long dashed double-dotted line for easy understanding. The erroneous input restriction region R1 is indicated by diagonal hatching.

As illustrated in FIG. 7, the touch surface 221 includes the erroneous input restriction region R1 and the standard region R2.

The standard region R2 includes the first touch position P1. In other words, the erroneous input restriction region R1 is set as the portion other than a region surrounding the first touch position P1. In the example illustrated in FIG. 7, the standard region R2 has a substantially circular shape with the first touch position P1 as a center thereof. The size and shape of the standard region R2 are predetermined. Data specifying the standard region R2 is stored in the storage 9. In the present embodiment, the size and shape of the standard region R2 are fixed. That is, the size and shape of the erroneous input restriction region R1 are fixed.

When the first object 31 is identified as the selected object 30S, the second object 32, the third object 33, and the fourth object 34 are included in the erroneous input restriction region R1. Therefore, even if the right hand RH touches the touch surface 221, the touch operation on any of the second object 32, the third object 33, and the fourth object 34 is determined to be invalid (step S201 in FIG. 4; Yes).

After the erroneous input restriction region R1 is set, the controller 10 waits until the touch operation is cancelled (step S302 in FIG. 5; No).

When determining that the touch operation has been cancelled (step S302 in FIG. 5; Yes), the controller 10 changes the erroneous input restriction region R1 as illustrated in FIGS. 7 and 8 based on the distance from the first touch position P1 (step S303 in FIG. 5). Specifically, the controller 10 gradually changes the erroneous input restriction region R1 to the standard region R2 according to the distance from the first touch position P1 and the elapsed time after cancellation of the touch operation. In other words, the controller 10 gradually releases setting of the erroneous input restriction region R1 according to the distance from the first touch position P1 and the elapsed time after cancellation of the touch operation. Specifically, the controller 10 changes the erroneous input restriction region R1 to the standard region R2 in a manner that a time it takes to cancel setting of the erroneous input restriction region R1 is changed according to the distance from the first touch position P1. Specifically, the controller 10 changes the erroneous input restriction region R1 to the standard region R2 in a manner that the standard region R2 radially expands. Hereinafter, the time from cancellation of the touch operation until a position (coordinate) on the touch surface 221 changes from the erroneous input restriction region R1 to the standard region R2 is referred to as "cancellation time" of the position. The controller 10 changes the erroneous input restriction region R1 to the standard region R2 in a manner that a longer cancellation time is set for a farther position from the first touch position P1.

In the example illustrated in FIG. 8, change from the erroneous input restriction region R1 to the standard region R2 on the second object 32, the third object 33, and the fourth object 34 starts in the stated order. In other words, the cancellation time is longer for the second object 32, the third object 33, and the fourth object 34 in the stated order. The relationship between the cancellation time and the distance from the first touch position P1 is set in advance and stored in the storage 9. Hereinafter, the relationship between the cancellation time and the distance from the first touch position P1 is referred to as a "cancellation speed".

The cancellation speed may be determined according to touch speed, for example. The touch speed is set by the user, for example. The user measures their touch speed and sets the measured touch speed. The touch speed is calculated based on, for example, the time required for the user's finger to successively touch two different points on the touch surface 221 and the distance between the two different points. Specifically, the touch speed is calculated by dividing the distance between the two different points by the required touch time. Since the cancellation speed is determined based on the touch speed, the object 30 to be touched in the next touch operation is precluded from being included in the erroneous input restriction region R1. In other words, a situation in which the next touch operation is not accepted is precluded. Therefore, a decrease in user convenience is inhibited.

Alternatively, the cancellation speed may be determined, for example, by the controller 10 learning the touch speed and determining the cancellation time according to the learned touch speed. This eliminates the need for the user to set the cancellation time according to their touch speed. Therefore, user convenience is improved.

Hereinbefore, the first embodiment has been described. According to the present embodiment, the erroneous input restriction region R1 is set based on the first touch position P1. Therefore, it is possible to inhibit a decrease in the degree of freedom of screen layout while inhibiting the occurrence of erroneous input.

Generally, the smaller the distance between a touch position and a position to be touched in the next touch operation is, the shorter the time required for the user's finger to reach the position to be touched in the next touch operation is. By contrast, the larger the distance between a touch position and a position to be touched in the next touch operation is, the longer the time required to reach the position to be touched in the next touch operation is. According to the present embodiment, the controller 10 changes the erroneous input restriction region R1 in a manner that the farther the position is from the first touch position P1, the longer the cancellation time is. Therefore, a situation in which the next touch operation is not accepted is inhibited while inhibiting the occurrence of erroneous input. Therefore, a decrease in user convenience is inhibited.

A case in which the detection sensitivity in the erroneous input restriction region R1 is substantially the same as the detection sensitivity in the standard region R2 has been described in the present embodiment. However, the detection sensitivity in the erroneous input restriction region R1 may be set to a second detection sensitivity lower than the detection sensitivity in the standard region R2 (the first sensitivity). The second detection sensitivity is set in a manner that at least one of the first area threshold, the first time threshold, and the first pressure threshold is higher than that of the first detection sensitivity. Setting the detection sensitivity lower in the erroneous input restriction region R1 than in the standard region R2 inhibits acceptance of an unintentional user touch. As a result, the occurrence of erroneous input can be inhibited. When the detection sensitivity in the erroneous input restriction region R1 is set to the second sensitivity, the controller 10 may omit performing the touch operation validity determining process described with reference to FIG. 4. When accepting a touch operation, the controller 10 determines that the touch operation is valid without determining whether or not the first touch position P1 is located within the erroneous input restriction region R1.

In the present embodiment, a case has been described in which the shape and size of the standard region R2 at the time of identification of the selected object 30S is fixed. However, the shape of the standard region R2 may not be fixed. Also, the size of the standard region R2 may not be fixed. For example, the controller 10 may change the size of the standard region R2 according to the touch area. For example, the controller 10 determines the size of the standard region R2 so that the size is at a specific ratio to the touch area. In this case, the size of the erroneous input restriction region R1 set at the time of identification of the selected object 30S changes according to the size of the standard region R2.

In the present embodiment, the controller 10 changes the erroneous input restriction region R1 to the standard region R2 in a manner that the standard region R2 radially expands. However, the way the controller 10 changes the erroneous input restriction region R1 is not limited thereto, so long as the change from the erroneous input restriction region R1 to the standard region R2 occurs later in a region with more likeliness of an erroneous input. The controller 10 may change the erroneous input restriction region R1 according to the type of the detection target. Specifically, when the detection target is the right hand RH, the controller 10 may change the erroneous input restriction region R1 located on the right side of the first touch position P1 on the touch surface 221 to the standard region R2 later than the erroneous input restriction region R1 located on the left side of the first touch position P1. When the detection target is the left hand LH, the controller 10 may change the erroneous input restriction region R1 located on the left side of the first touch position P1 on the touch surface 221 to the standard region R2 later than the erroneous input restriction region R1 located on the right side of the first touch position P1.

Second Embodiment

Next, the information input device 100 according to a second embodiment will be described with reference to FIGS. 1 to 10. The second embodiment is different from the first embodiment in that the erroneous input restriction region is changed according to the touch position. Hereinafter, matters different from those in the first embodiment will be described in the second embodiment, and description of matters overlapping with those in the first embodiment will be omitted.

In the present embodiment, after identifying the selected object 30S, the controller 10 executes a region range determining process. In the region range determining process, the controller 10 changes, based on the touch position, at least one of the size and shape of the erroneous input restriction region set at the time of identification of the selected object 30S. Specifically, the controller 10 changes at least one of the size and shape of the erroneous input restriction region to be set by changing the setting rule to be referred to at the time when the erroneous input restriction region is set.

Figure 9:
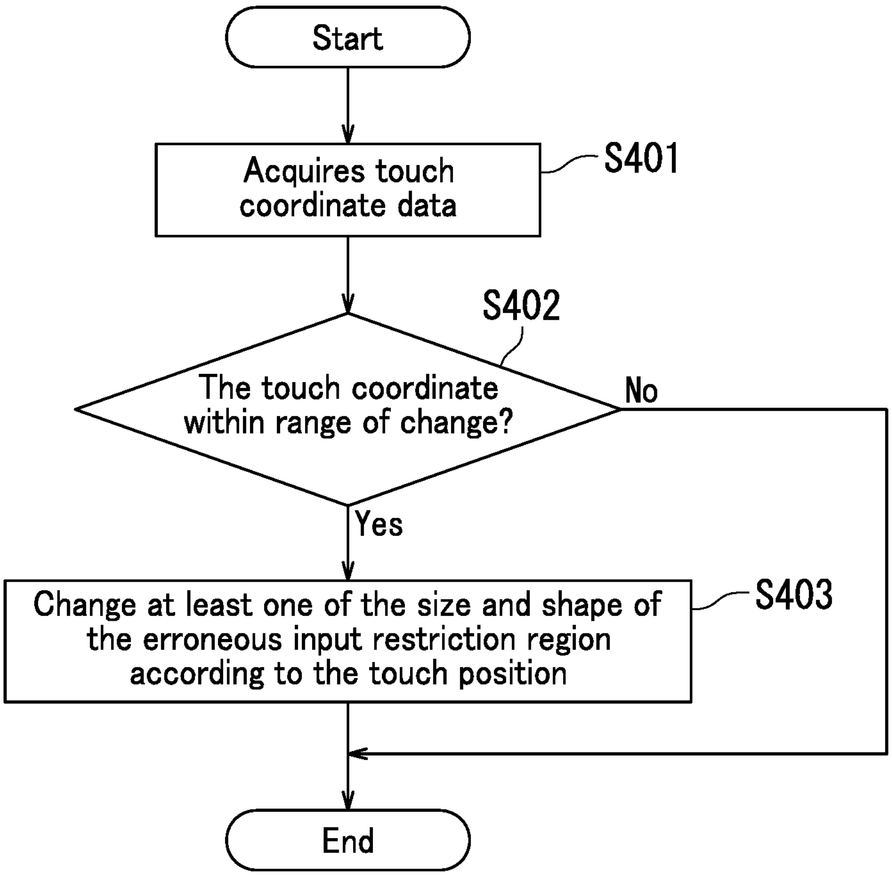
FIG. 9 is a flowchart illustrating a region range determining process in a second embodiment of the present disclosure.

FIG. 9 is a flowchart illustrating the region range determining process in the second embodiment. As illustrated in FIG. 9, the controller 10 acquires coordinate data of the touch position (step S401). Next, the controller 10 determines whether or not the coordinate data of the touch position is within a range of change (step S402). Data specifying the range of change is set in advance and stored in the storage 9. The range of change is, for example, a portion surrounded by an outline located at a specific distance inside the respective four outer edges of the touch surface 221.

When determining that the coordinate data of the touch position is not within the range of change set in advance (step S402; No), the region range determining process by the controller 10 ends without change of the size or shape of the erroneous input restriction region. Specifically, as described in the first embodiment, the controller 10 sets the erroneous input restriction region by referring to the first rule.

When determining that the coordinate data of the touch position is located within the range of change set in advance (step S402; Yes), the controller 10 changes at least one of the size and shape of the erroneous input restriction region (step S403). Specifically, the controller 10 changes the setting rule to be referred to in setting the erroneous input restriction region. In the present embodiment, the controller 10 changes the setting rule to be referred to from the first rule to a second rule. The second rule is, for example, a setting rule providing that the erroneous input restriction region is set as a region of the touch surface 221 other than the standard region and an excluded region.

The excluded region is set in a region where there is a low possibility of occurrence of erroneous input. The excluded region is set in advance, for example, according to the touch position and stored in the storage 9. Specifically, the storage 9 stores the coordinate data of the touch position in association with the data specifying the excluded region. The data specifying the excluded region includes coordinate data of the start point and coordinate data of the end point of the excluded region. After changing the setting rule to be referred to in setting the erroneous input restriction region to the second rule, the controller 10 acquires the data specifying the excluded region associated with the coordinate data of the touch position from the storage 9. After acquiring the data specifying the excluded region, the controller 10 sets the erroneous input restriction region on the touch surface 221 based on the data specifying the excluded region and data specifying the standard region.

Figure 10:
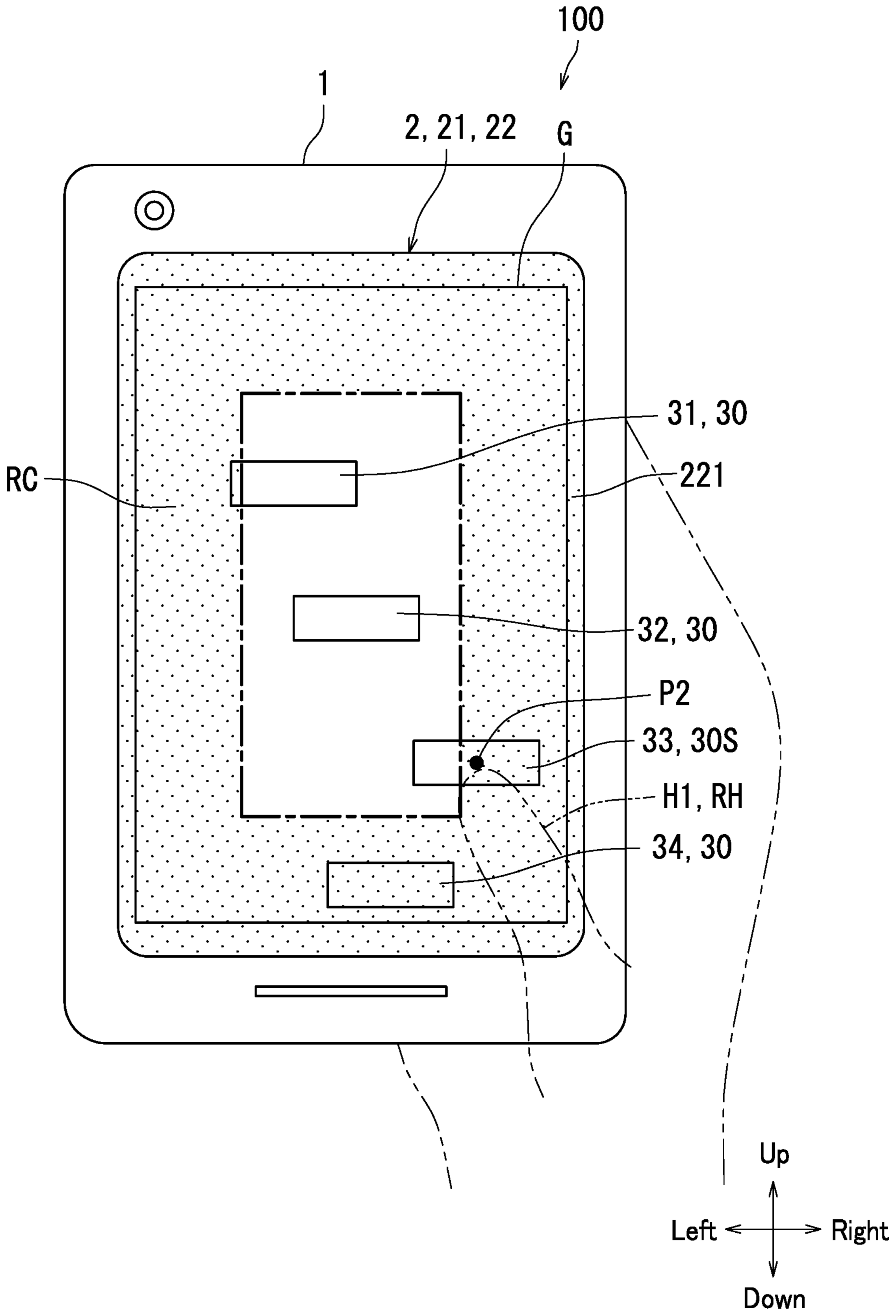
FIG. 10 is a diagram illustrating an example of a touch operation in the second embodiment of the present disclosure.

Next, the touch operation in the second embodiment will be specifically described with reference to FIGS. 1 to 12. FIG. 10 is a diagram illustrating an example of the touch operation in the second embodiment. Specifically, FIG. 10 illustrates a touch operation in selecting the third object 33. The dot hatching in FIG. 10 indicates the range RC of change described with reference to FIG. 9. In FIG. 10, the user holds the information input device 100 with the right hand RH and touches the touch surface 221 with the right thumb H1. Hereinafter, the touch position indicated in FIG. 10 is referred to as "second touch position P2". In FIG. 10, the user's right hand RH is indicated by long dashed double-dotted lines for easy understanding. Note that there are no erroneous input restriction regions set in the screen G illustrated in FIG. 10.

As illustrated in FIG. 10, when the user touches the second touch position P2 with the right thumb H1 in order to select the third object 33, the controller 10 executes the touch operation accepting process (see FIG. 3). In the example illustrated in FIG. 10, the second touch position P2 is a position corresponding to the third object 33 (on the third object 33). Therefore, the controller 10 accepts the touch on the second touch position P2 as a touch operation (step S103 in FIG. 3).

When accepting the touch operation, the controller 10 executes the touch operation validity determining process (see FIG. 4). In the example illustrated in FIG. 10, no erroneous input restriction regions are set. Therefore, the controller 10 determines that the accepted touch operation is valid (step S203 in FIG. 4), and identifies the selected object 30S as the third object 33 (step S204 in FIG. 4).

After identifying the selected object 30S, the controller 10 executes the region range determining process (see FIG. 9). In the example illustrated in FIG. 10, the second touch position P2 is included in the range RC of change. Therefore, the controller 10 changes at least one of the size and shape of the erroneous input restriction region (step S403 in FIG. 9). Specifically, the controller 10 changes the setting rule to be referred to in setting the erroneous input restriction region. Specifically, the controller 10 changes the setting rule to be referred to in setting the erroneous input restriction region from the first rule (see FIG. 6) to the second rule.

Figure 11:
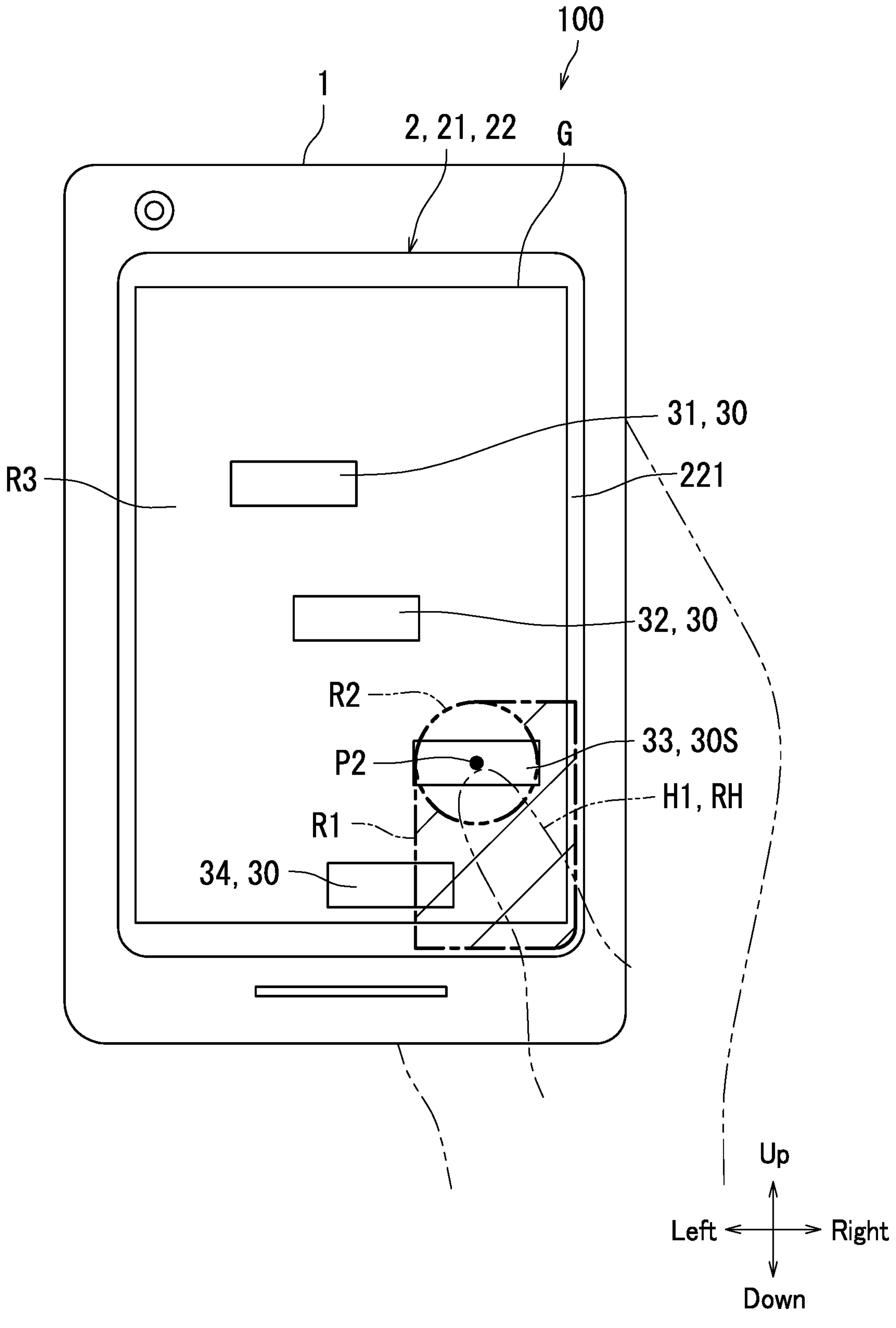
FIG. 11 is a diagram illustrating an example of an erroneous input restriction region in the second embodiment of the present disclosure.

FIG. 11 is a diagram illustrating an example of the erroneous input restriction region R1 in the second embodiment. Specifically, FIG. 11 illustrates an erroneous input restriction region R1 at the time when the third object 33 is specified as the selected object 30S. In FIG. 11, the erroneous input restriction region R1 is surrounded by a long dashed dotted line and the standard region R2 is surrounded by a long dashed double-dotted line. The erroneous input restriction region R1 is indicated by diagonal hatching.

As illustrated in FIG. 11, the touch surface 221 includes the erroneous input restriction region R1, the standard region R2, and the excluded region R3. In other words, the erroneous input restriction region R1 is set as a region of the touch surface 221 other than the standard region R2 and the excluded region R3. The standard region R2 in FIG. 11 is substantially the same as the standard region R2 described with reference to FIG. 7. In the example illustrated in FIG. 11, the excluded region R3 is a region on the left side or the upper side of the standard region R2. The erroneous input restriction region R1 is a region on the right side and the lower side of the standard region R2. Specifically, the erroneous input restriction region R1 is a region surrounded by a part of the outer edge of the standard region R2, outer tangents of the standard region R2, and a part of two outer edges close to the second touch position P2 among the four outer edges of the touch surface 221 (the outer edge on the right side and the outer edge on the lower side). The outer tangents of the standard region R2 are, for example, perpendiculars of two outer edges close to the second touch position P2, the perpendiculars each extending to the outer edge of the standard region R2.

As described with reference to FIG. 6, the third object 33 is located near the outer edge on the right side of the touch surface 221. Therefore, the user's right hand RH is likely to touch the right side and the lower side of the third object 33, and less likely to touch the left side and the upper side of the third object 33. Therefore, by setting the region on the right side and the lower side of the standard region R2 as the erroneous input restriction region R1, occurrence of erroneous input is inhibited.

Figure 12:
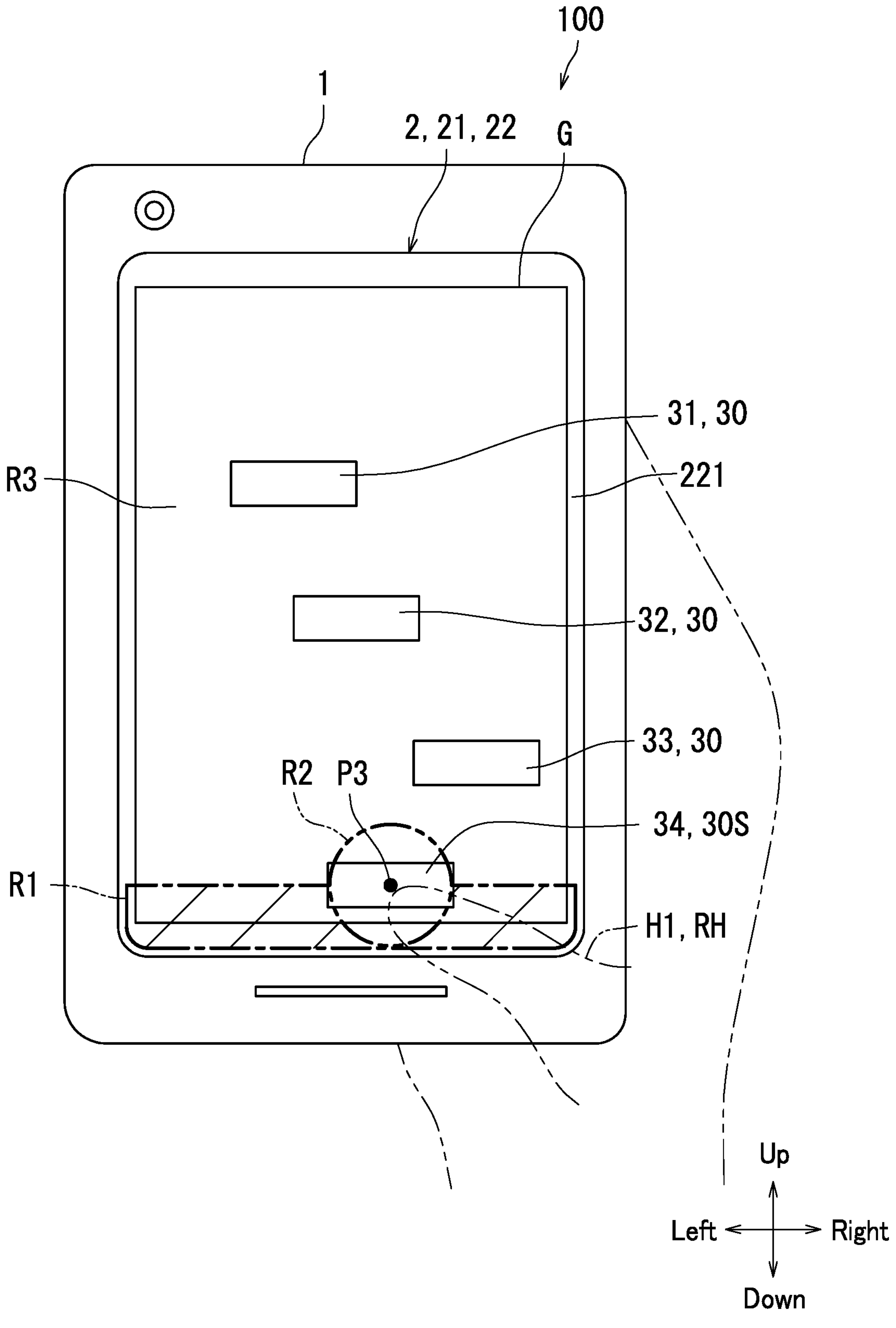
FIG. 12 is a diagram illustrating another example of the erroneous input restriction region in the second embodiment of the present disclosure.

Next, another example of the erroneous input restriction region R1 in the second embodiment will be described with reference to FIG. 12. FIG. 12 is a diagram illustrating another example of the erroneous input restriction region R1 in the second embodiment. Specifically, FIG. 12 illustrates an erroneous input restriction region R1 at the time when the fourth object 34 is specified as the selected object 30S. In FIG. 12, the erroneous input restriction region R1 is surrounded by a long dashed dotted line and the standard region R2 is surrounded by a long dashed double-dotted line. The erroneous input restriction region R1 is indicated by diagonal hatching.

As illustrated in FIG. 12, the touch surface 221 includes the erroneous input restriction region R1, the standard region R2, and the excluded region R3. The erroneous input restriction region R1 is a region other than the standard region R2 and the excluded region R3. The standard region R2 in FIG. 12 is substantially the same as the standard region R2 described with reference to FIG. 7. In the example illustrated in FIG. 12, the excluded region R3 is a region on the upper side of the standard region R2. The erroneous input restriction region R1 is a region on the lower side of the standard region R2. Specifically, the erroneous input restriction region R1 is a region surrounded by the outer edge of the standard region R2, the outer edge closest to the third touch position P3 among the four outer edges of the touch surface 221, and a straight line. The straight line is a straight line connecting two outer edges facing each other in the left-right direction among the four outer edges of the touch surface 221.

As described with reference to FIG. 6, the fourth object 34 is located near the outer edge on the lower side of the touch surface 221. Therefore, the user's right hand RH is likely to touch the lower side of the fourth object 34, and less likely to touch the upper side of the fourth object 34. Therefore, by setting the erroneous input restriction region R1 as the region on the lower side of the standard region R2, occurrence of erroneous input is inhibited.

After setting the erroneous input restriction region, the controller 10 waits until the touch operation is cancelled (step S302; No in FIG. 5). When determining that the touch operation has been cancelled (step S302 in FIG. 5; Yes), the controller 10 changes the erroneous input restriction region R1 (step S303 in FIG. 5). Specifically, the controller 10 changes the erroneous input restriction region according to the elapsed time after cancellation of the touch operation.

Hereinbefore, the second embodiment has been described. In the present embodiment, at least one of the size and shape of the erroneous input restriction region R1 set at the time of identification of the selected object 30S changes according to the touch position. As a result, setting the erroneous input restriction region R1 in a region where there is a low possibility of occurrence of erroneous input is restricted. In other words, useless setting of the erroneous input restriction region R1 is restricted. Therefore, user convenience is improved.

Note that the controller 10 may determine whether or not the erroneous input restriction region R1 needs to be set based on the touch position. The storage 9 stores therein, for example, data specifying an exempt-from-setting region on the touch surface 221 which region does not need to be set as the erroneous input restriction region R1. The data specifying the exempt-from-setting region contains coordinate data specifying the start point of the exempt-from-setting region and coordinate data specifying the end point of the exempt-from-setting region. The exempt-from-setting region is, for example, a region closer to the outer edge of the touch surface 221 than the range of change. The controller 10 may determine whether or not the erroneous input restriction region R1 needs to be set by determining whether or not coordinate data specifying the touch position is included in the exempt-from-setting region. As a result, useless setting of the erroneous input restriction region R1 is inhibited, and thereby unnecessary load on the controller 10 is inhibited.

Third Embodiment

Next, the information input device 100 according to a third embodiment will be described with reference to FIGS. 1 to 16. The third embodiment is different from the first embodiment and the second embodiment in that the erroneous input restriction region is changed according to the type of the detection target. Hereinafter, matters different from those in the first embodiment and the second embodiment will be described in the third embodiment, and description of matters overlapping with those in the first embodiment and the second embodiment will be omitted.

In the present embodiment, after identifying the selected object 30S, the controller 10 executes the region range determining process. In the region range determining process, the controller 10 changes, according to the type of the detection target, at least one of the size and shape of the erroneous input restriction region set at the time of identification of the selected object 30S. Specifically, the controller 10 changes at least one of the size and shape of the erroneous input restriction region set as a portion of the touch surface 221 depending on which of the right hand, the left hand, and a stylus the detection target is.

Figure 13:
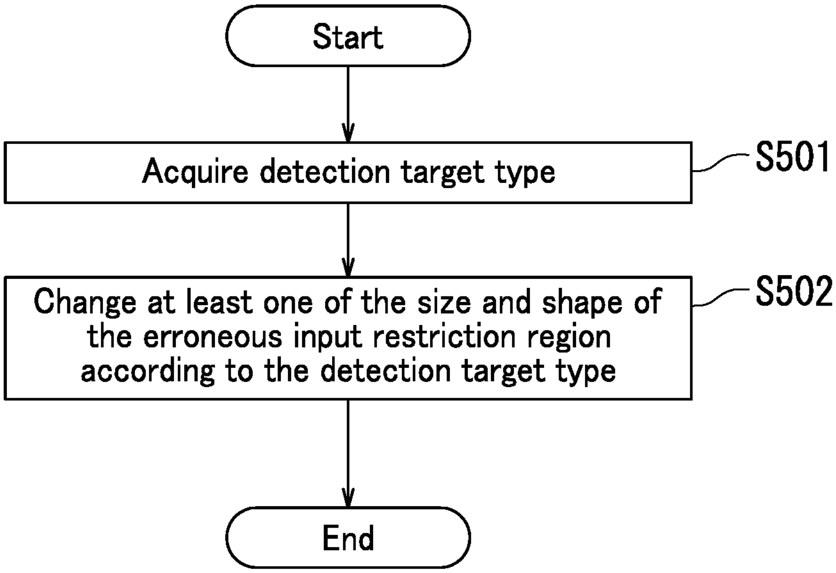
FIG. 13 is a flowchart illustrating a region range determining process in a third embodiment of the present disclosure.

FIG. 13 is a flowchart illustrating the region range determining process in the third embodiment. As illustrated in FIG. 13, the controller 10 acquires a detection target type (step S501). The controller 10 acquires the detection target type, for example, by referring to the detection target type data stored in the storage 9 (see FIG. 2). Next, the controller 10 changes the erroneous input restriction region according to the detection target type. Specifically, the controller 10 changes the setting rule to be referred to at the time when the erroneous input restriction region is set to a setting rule by which the erroneous input restriction region is determined depending on the detection target type (step S502) and the region range determining process ends. Hereinafter, the setting rule by which the erroneous input restriction region is determined depending on the detection target type is referred to as a "third rule".

The third rule is a rule providing that a region where erroneous input is likely to occur is set as the erroneous input restriction region. The third rule associates detection target types with erroneous input restriction regions each corresponding to one of the detection target types. The third rule is a rule providing that, for example, a region of the touch surface 221 on which the right hand is likely to contact is set as an erroneous input restriction region in a situation in which the detection target type is the right hand. Also, the third rule is a rule providing that the region of the touch surface 221 on which the left hand is likely to contact is set as an erroneous input restriction region in a situation in which the detection target type is the left hand. In addition, the third rule is a rule providing that a region of the touch surface 221 on which the hand holding the stylus is likely to contact is set as an erroneous input restriction region in a situation in which the detection target type is a stylus.

Figure 14:
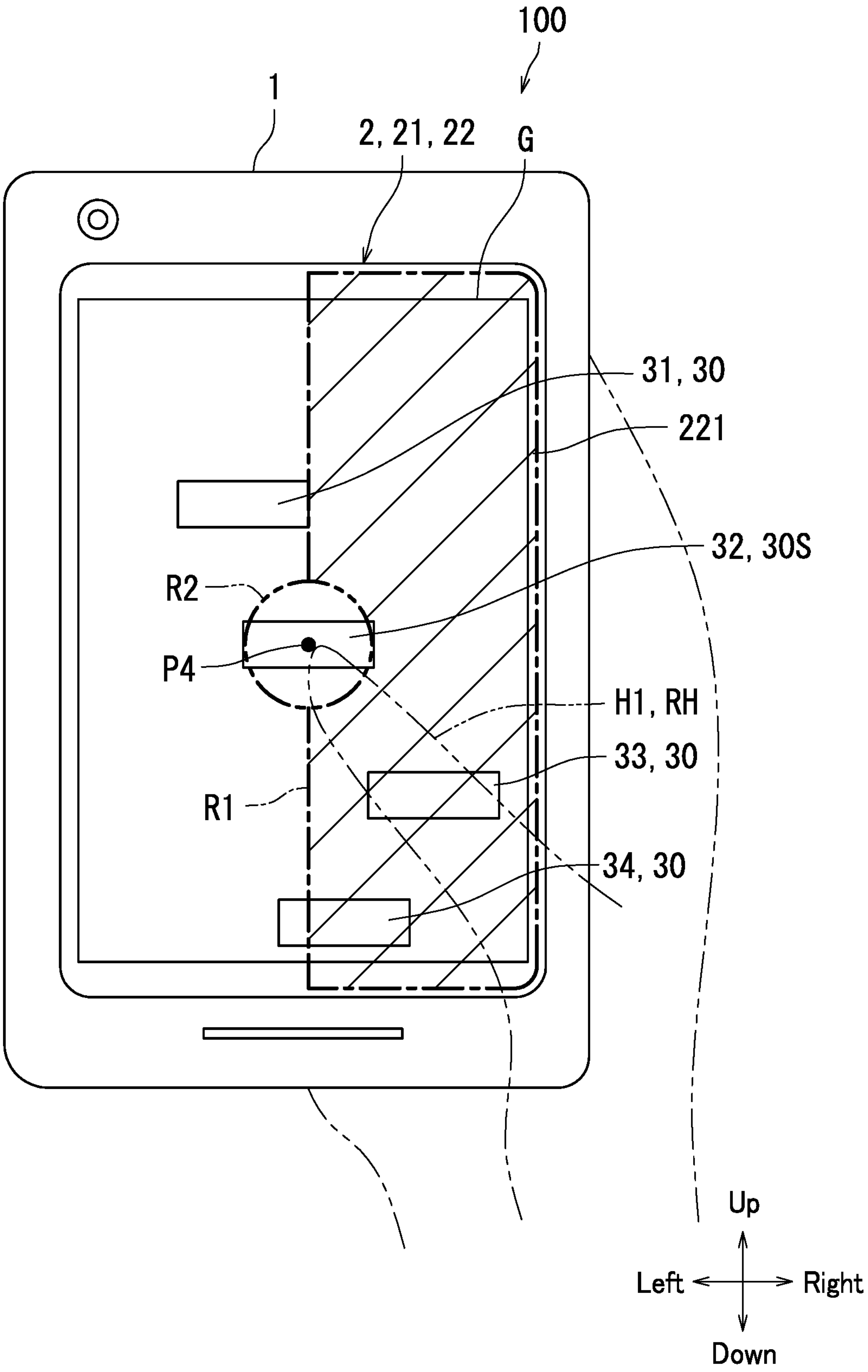
FIG. 14 is a diagram illustrating an example of an erroneous input restriction region in the third embodiment of the present disclosure.
Figure 15:
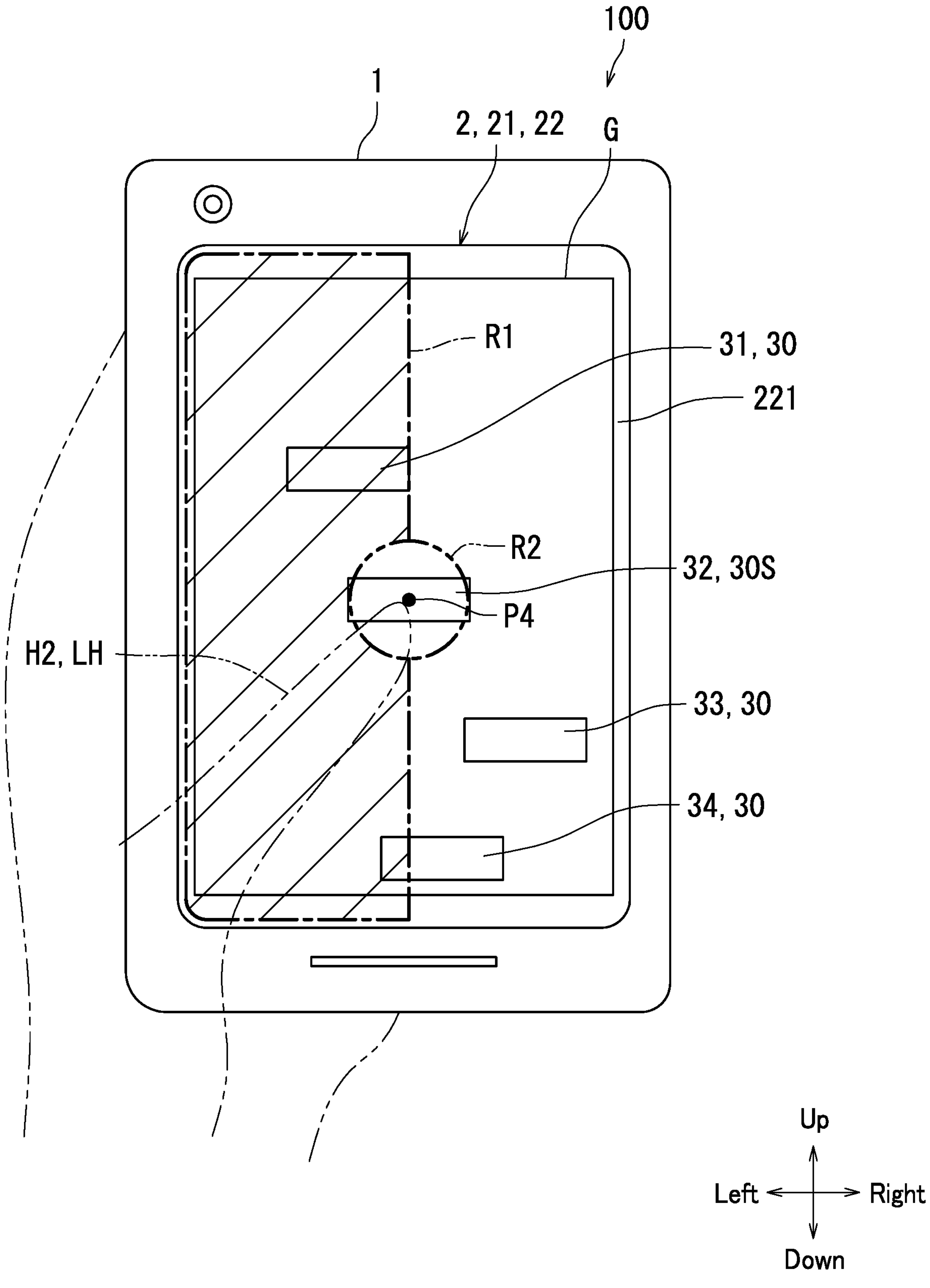
FIG. 15 is a diagram illustrating an example of the erroneous input restriction region in the third embodiment of the present disclosure.
Figure 16:
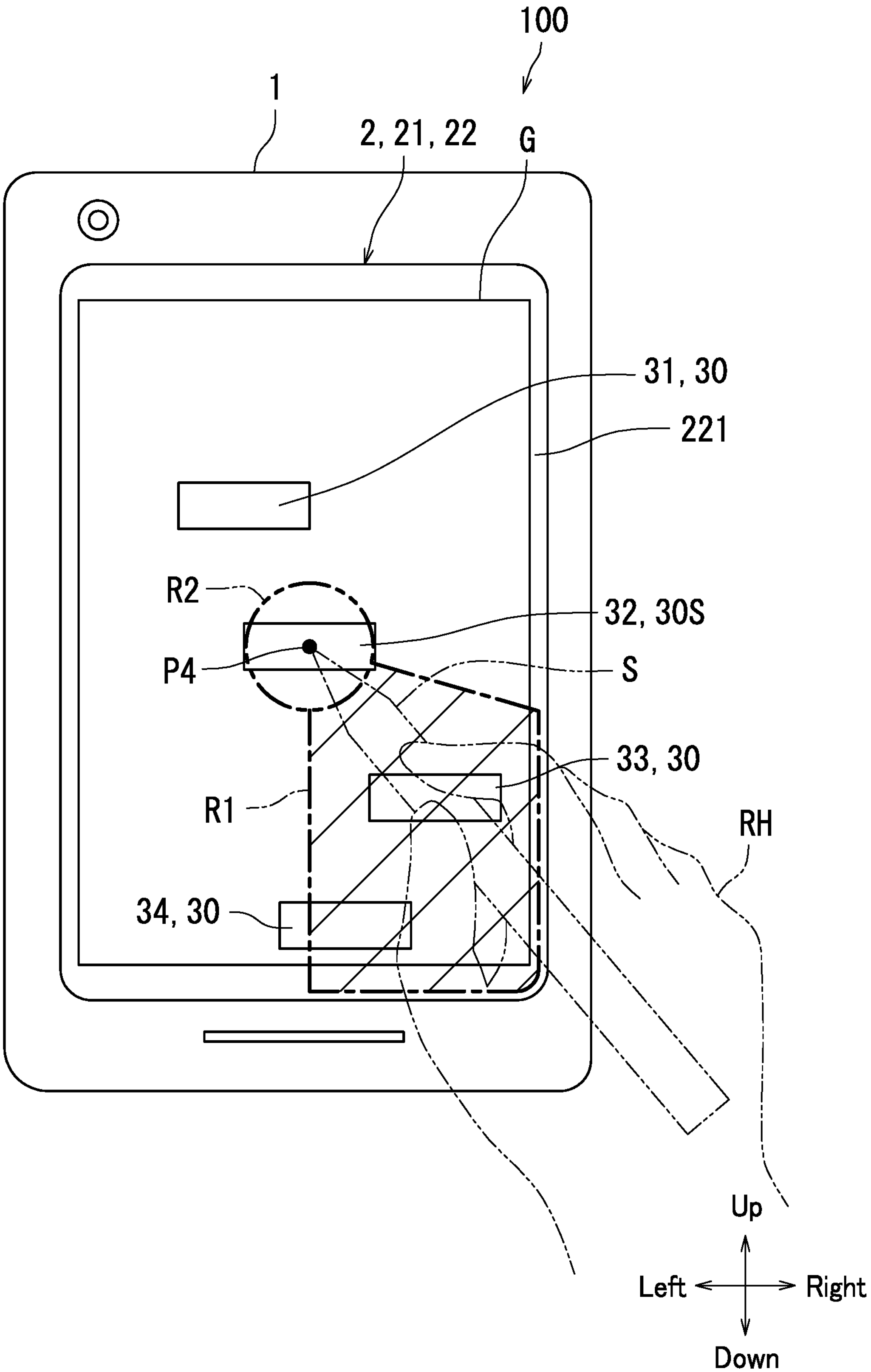
FIG. 16 is a diagram illustrating an example of the erroneous input restriction region in the third embodiment of the present disclosure.

Next, the erroneous input restriction region R1 in the third embodiment will be specifically described with reference to FIGS. 14 to 16. FIGS. 14 to 16 are diagrams each illustrating an example of the erroneous input restriction region R1 in the third embodiment. Specifically, FIG. 14 illustrates an erroneous input restriction region R1 set in a situation in which the detection target is the user's right hand RH. In FIG. 14, the user holds the information input device 100 with the right hand RH and touches the touch surface 221 with the thumb H1 of the right hand RH. FIG. 15 illustrates an erroneous input restriction region R1 set in a situation in which the detection target is the user's left hand LH. In FIG. 15, the user holds the information input device 100 with the left hand LH and touches the touch surface 221 with a thumb H2 of the left hand LH. FIG. 16 illustrates an erroneous input restriction region R1 set in a situation in which the detection target is a stylus S. In FIG. 16, the user touches the touch surface 221 with a stylus S held by the right hand RH. Hereinafter, the touch position illustrated in each of FIGS. 14 to 16 is referred to as a "fourth touch position P4". In FIGS. 14 to 16, the detection target (the user's right hand RH, the user's left hand LH, and the stylus S) is indicated by long dashed double-dotted lines for easy understanding. The erroneous input restriction region R1 is surrounded by a long dashed dotted line, and the standard region R2 is surrounded by a long dashed double-dotted line. Further, the erroneous input restriction region R1 is indicated by diagonal hatching.

As illustrated in FIG. 14, in a situation in which the detection target is the user's right hand RH, the user's right hand RH is likely to touch the right side region of the touch surface 221 and less likely to touch the left side region. Therefore, the controller 10 sets, as the erroneous input restriction region R1, a region on the right side of the fourth touch position P4 excluding the standard region R2.

By contrast, in a situation in which the detection target is the user's left hand LH, the user's left hand LH is likely to touch the left side region of the touch surface 221 and less likely to touch the right side region. Therefore, the controller 10 sets, as the erroneous input restriction region R1, a region on the left side of the fourth touch position P4 excluding the standard region R2.

As illustrated in FIG. 16, in a situation in which the detection target is the stylus S, the user's hand holding the stylus S is likely to touch a region on the lower right side of the fourth touch position P4 of the touch surface 221 and less likely to touch the region upper than the fourth touch position P4. Therefore, the controller 10 sets, as the erroneous input restriction region R1, a region on the lower right side of the fourth touch position P4 of the touch surface 221 excluding the standard region R2.

Hereinbefore, the third embodiment has been described. According to the present embodiment, the erroneous input restriction region R1 is set according to the type of the detection target. Therefore, useless setting of the erroneous input restriction region R1 is inhibited, and a decrease in user convenience is inhibited.

In the present embodiment, the controller 10 determines the type of the detection target based on the detection target type data stored in the storage 9, but the controller 10 may determine the type of the detection target based on any of the touch area, the touch pressure, and the shape of the touch area.

A case where the stylus S is held by the right hand RH has been described in the present embodiment, but the stylus S may be held by the left hand LH. In this case, the controller 10 sets, as the erroneous input restriction region R1, a region on the lower left side of the fourth touch position P4 of the touch surface 221 excluding the standard region R2. Note that the user may set the stylus S being held by the right hand RH or the left hand LH as the detection target type. The controller 10 may set the erroneous input restriction region R1 depending on whether the stylus S is held by the right hand RH or the left hand LH.

Hereinbefore, embodiments of the present disclosure have been described with reference to drawings (FIGS. 1 to 16). However, the present disclosure is not limited to the above embodiments and may be implemented in various different forms that do not deviate from the essence of the present disclosure. Further, the configuration described in the above embodiments is merely an example that does not impose any particular limitations and may be altered in various ways so long as such alterations do not substantially deviate from the effects of the present disclosure.

For example, in the embodiments of the present disclosure, the number of the objects 30 is four, but the number of the objects 30 is not limited to four and may be any number greater than 1.

A case where the display 21 is a liquid crystal display has been described in the embodiments of the present disclosure, but the display 21 is not limited to a liquid crystal display. The display 21 may be, for example, an organic electro luminescence (EL) display.

A case where the touch sensor 22 is a capacitive touch sensor has been described in the embodiments of the present disclosure, but the touch sensor 22 is not limited to a capacitive touch sensor. The touch sensor 22 may be, for example, a resistive touch sensor.

A case where the touch panel 2 is longer in the vertical direction has been described in the embodiments of the present disclosure, but the touch panel 2 may be longer in the left-right direction. The size and shape of the erroneous input restriction region R1 set at the time of identification can be changed according to the shape of the touch panel 2. Further, after a touch is cancelled, the erroneous input restriction region R1 may change according to the shape of the touch panel 2.

In addition, matters described in the first to the third embodiments can be combined as appropriate. For example, a matter described in the second embodiment and a matter described in the third embodiment may be combined.

What is claimed is:

1. An information input device comprising:
- a display configured to display a plurality of objects;
- a touch sensor having a touch surface and configured to output a signal indicating a touch position at which the touch surface is touched by a detection target; and
- a controller configured to receive the signal indicating the touch position, wherein
- when receiving the signal indicating the touch position, the controller determines whether the touch position is a position corresponding to any of the objects,
- when determining that the touch position is a position corresponding to any of the objects, the controller accepts the touch as a touch operation,
- when accepting the touch operation, the controller sets a portion of the touch surface as an erroneous input restriction region,
- the erroneous input restriction region is a region in which erroneous input by the detection target is restricted,
- the controller sets the erroneous input restriction region based on the touch position,
- the controller determines whether or not the touch operation is cancelled,
- when determining that the touch operation is cancelled, the controller changes the erroneous input restriction region based on the touch position,
- the controller changes the erroneous input restriction region based on a distance from the touch position, and
- the controller changes the erroneous input restriction region in a manner that the erroneous input restriction is cancelled radially from the touch position of the cancelled touch operation, such that a longer cancellation time from cancellation of the touch operation to cancellation of a corresponding portion of the erroneous input restriction region is set for the corresponding portion of the erroneous input restriction region farther from the touch position than a portion of the erroneous input restriction region closer to the touch position.

2. The information input device according to claim 1, wherein
- the controller learns a touch speed of a user's finger successively touching two different points and determines a cancellation speed according to the learned touch speed, and
- the controller calculates the touch speed based on the cancellation speed and the distance from the touch position.

3. The information input device according to claim 1, wherein
- the controller changes, based on the touch position, at least one of size and shape of the erroneous input restriction region set as a portion of the touch surface.

4. The information input device according to claim 1, wherein
- the controller changes the erroneous input restriction region according to a type of the detection target.

5. The information input device according to claim 4, wherein
- the detection target is at least one of a right hand finger and a left hand finger,
- the controller determines whether the detection target is the right hand finger or the left hand finger, and
- according to whether the detection target is the right hand finger or the left hand finger, the controller changes at least one of size and shape of the erroneous input restriction region set as a portion of the touch surface.

6. The information input device according to claim 5, wherein when determining that the touch operation is cancelled, the controller changes the erroneous input restriction region according to whether the detection target is the right hand finger or the left hand finger.

7. The information input device according to claim 1, wherein the controller invalidates the touch detected in the erroneous input restriction region.

8. The information input device according to claim 1, wherein the controller sets a second sensitivity lower than a first sensitivity in the erroneous input restriction region, the first sensitivity and the second sensitivity each being a sensitivity at which the touch at the touch position is detected.

* * * * *